June 28, 1932.  F. KRUEGER ET AL  1,865,020
APPARATUS FOR DRYING CAN ENDS CONTAINING A SEALING COMPOUND
Filed June 12, 1929  7 Sheets-Sheet 5
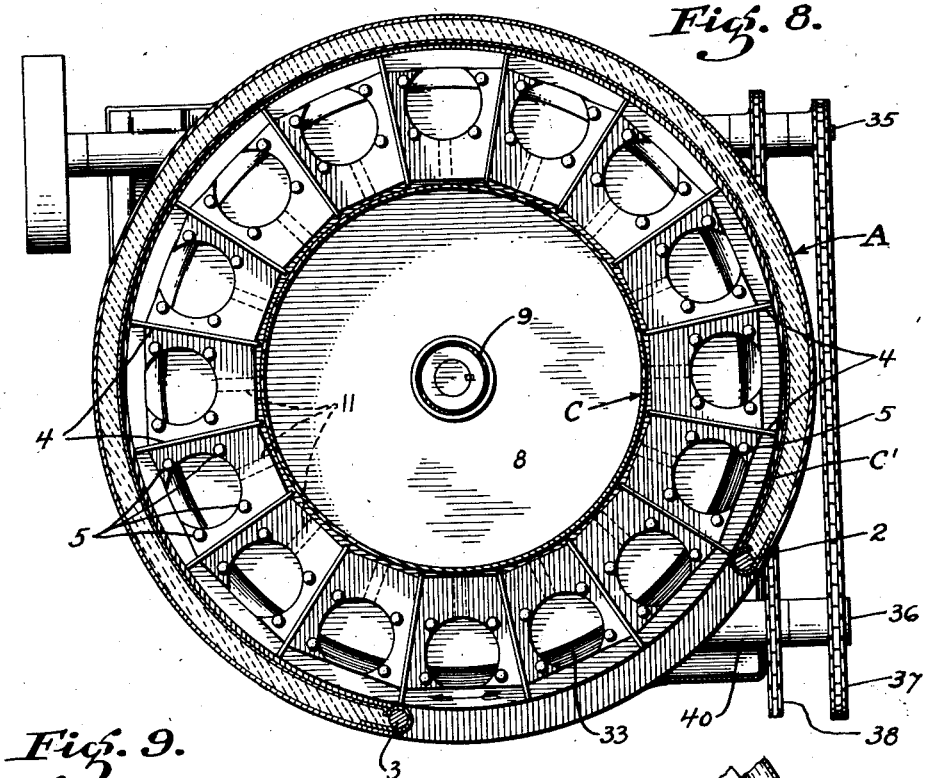
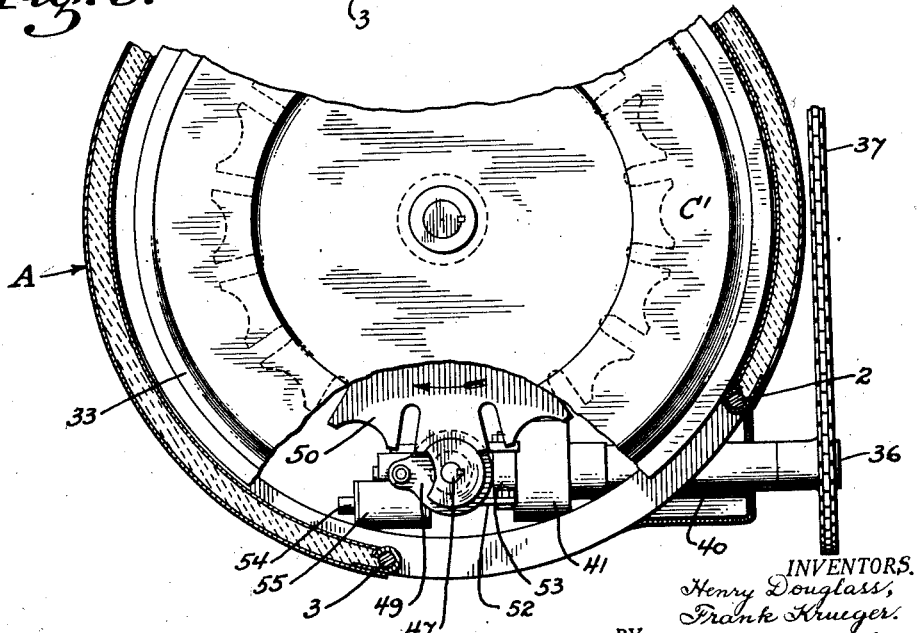
INVENTORS.
Henry Douglass,
Frank Krueger.
BY
Townsend, Loftus + Abbett
ATTORNEYS.

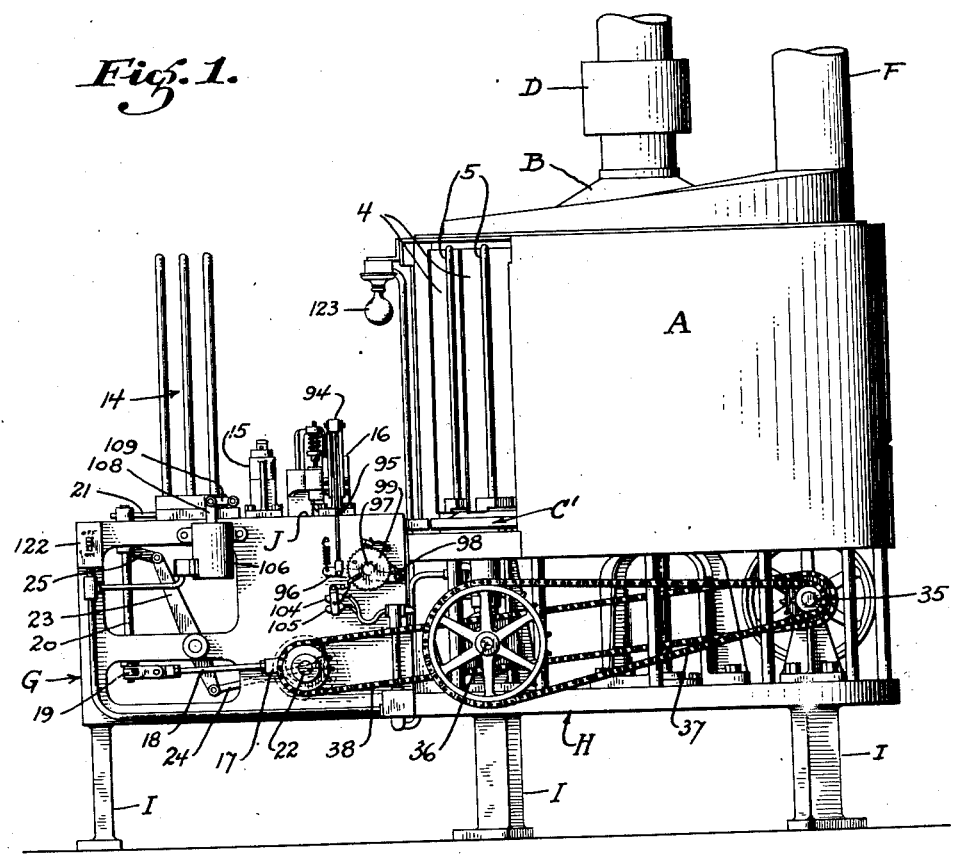

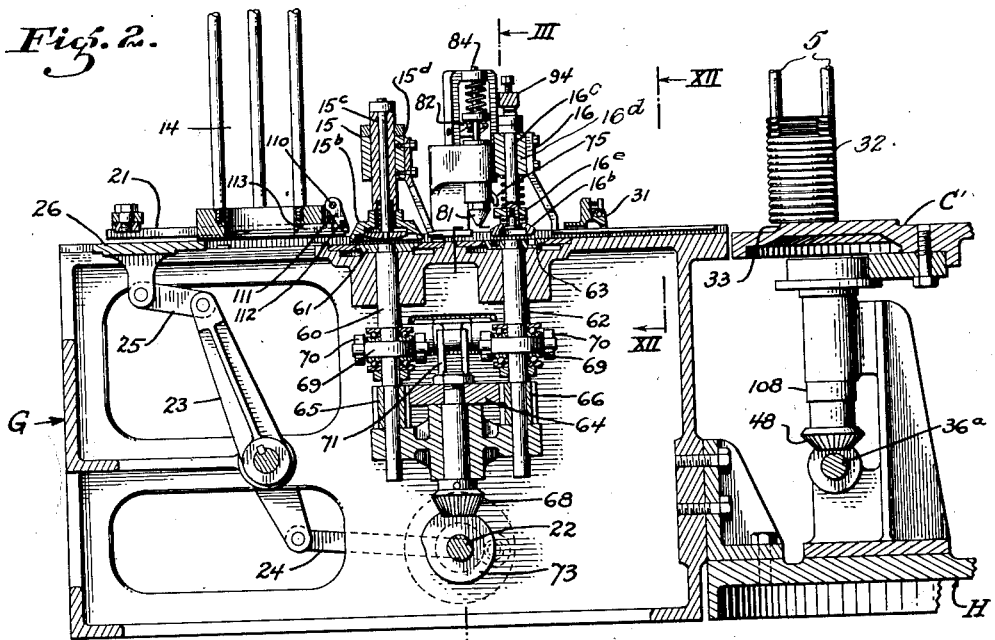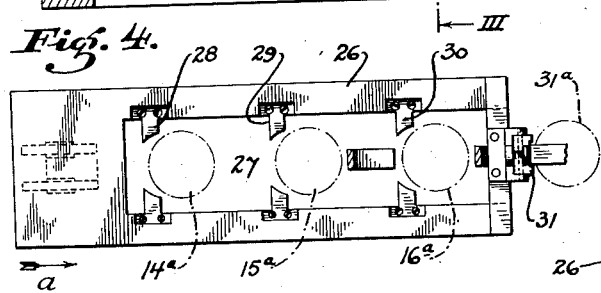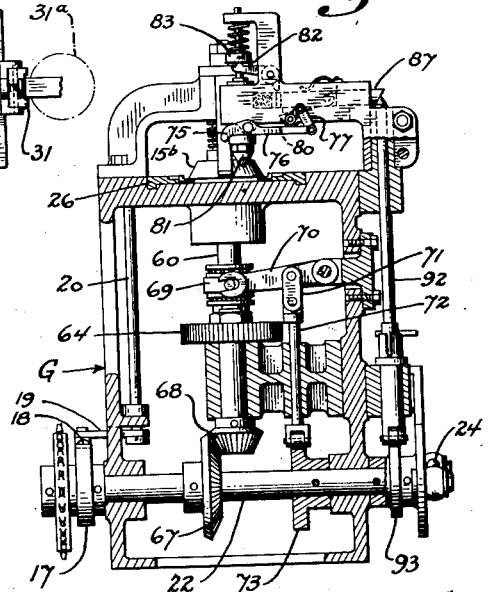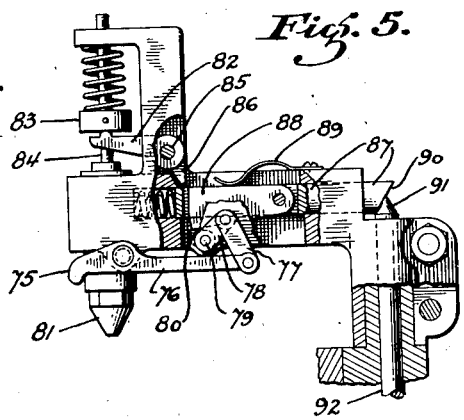

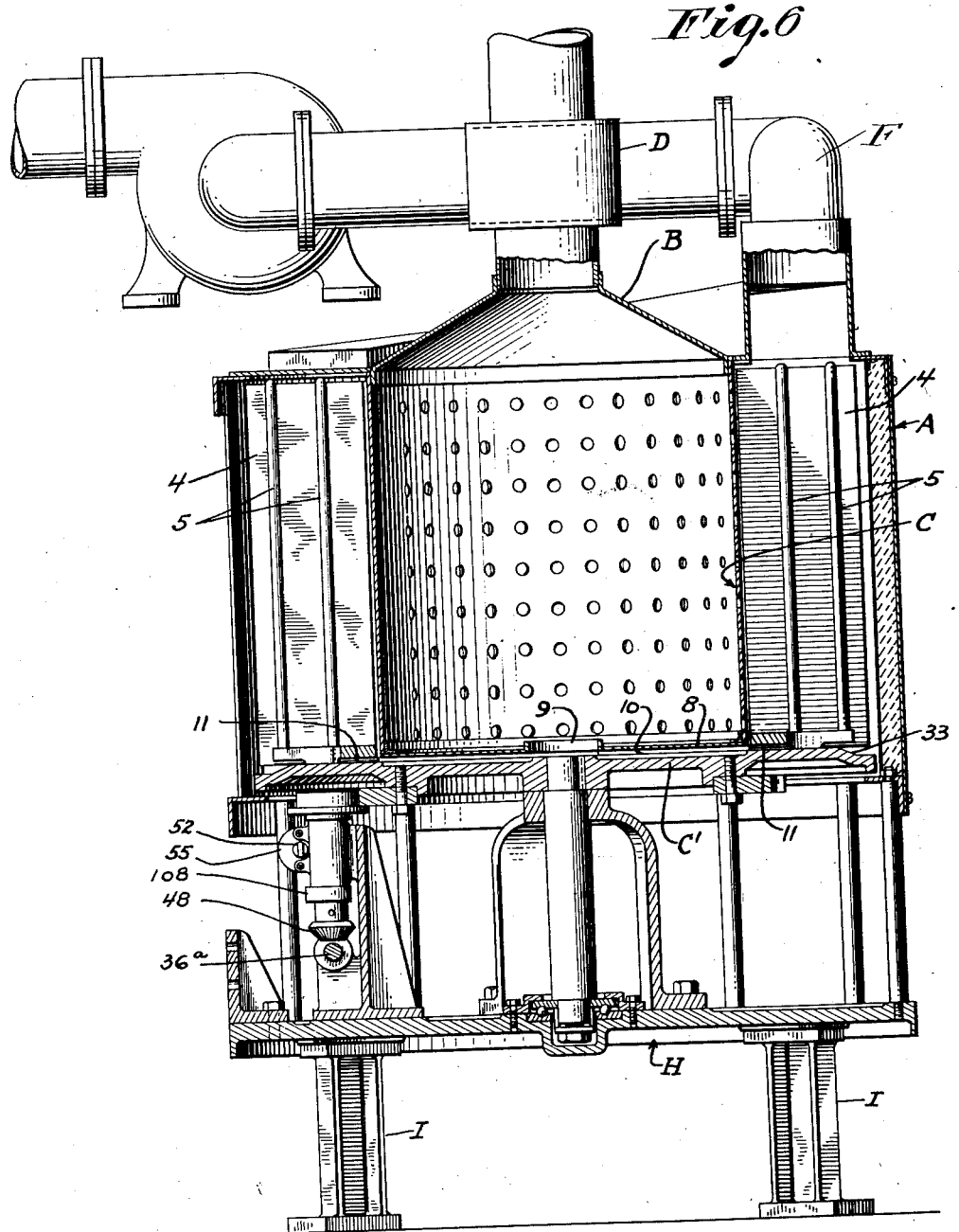

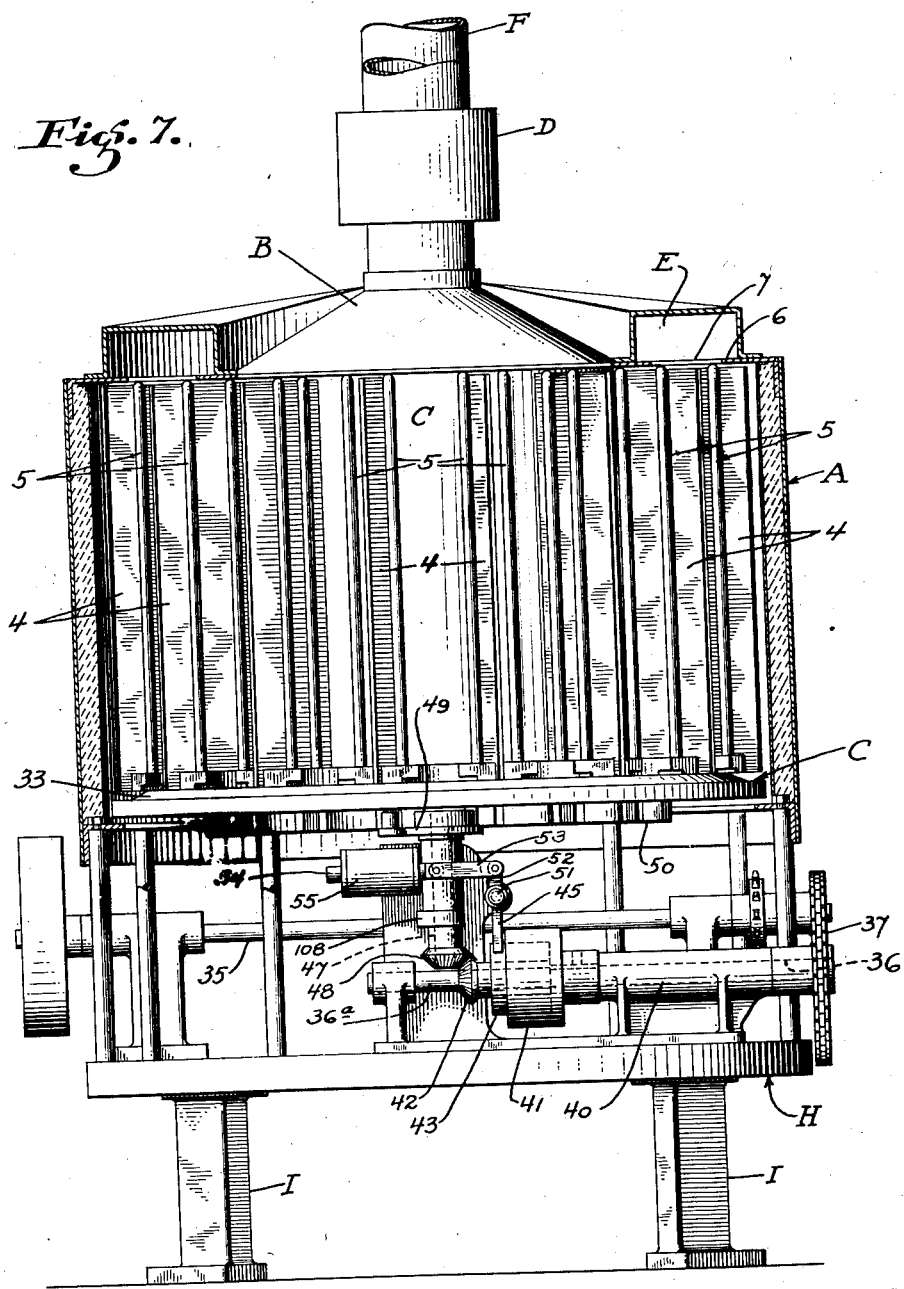

June 28, 1932.  F. KRUEGER ET AL  1,865,020
APPARATUS FOR DRYING CAN ENDS CONTAINING A SEALING COMPOUND
Filed June 12, 1929    7 Sheets-Sheet 6

INVENTORS.
Henry Douglass,
Frank Krueger.
BY Townsend, Loftus & Hackett
ATTORNEYS.

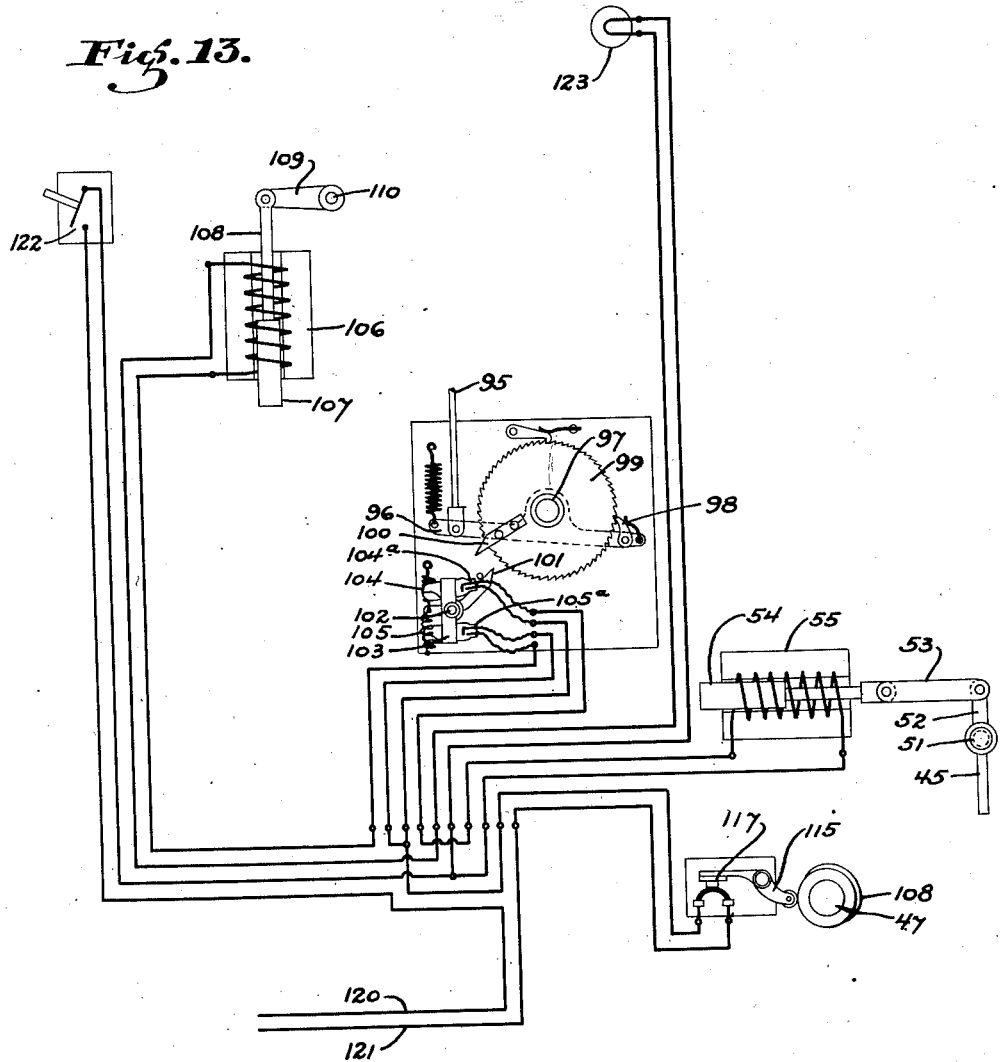

Patented June 28, 1932

1,865,020

UNITED STATES PATENT OFFICE

FRANK KRUEGER AND HENRY DOUGLASS, OF SAN FRANCISCO, CALIFORNIA, ASSIGNORS TO PACIFIC CAN CO., OF SAN FRANCISCO, CALIFORNIA, A CORPORATION OF NEVADA

APPARATUS FOR DRYING CAN ENDS CONTAINING A SEALING COMPOUND

Application filed June 12, 1929. Serial No. 370,444.

This invention relates to an apparatus for drying can ends containing a sealing compound, and especially to a rotary drier to which the can ends are delivered and stacked, and dried in stacked formation.

The object of the present invention is to generally improve and simplify the construction and operation of machines for drying can ends containing a sealing compound; to provide means for lining can ends with the sealing compound; to provide a rotary drier whereby the can ends are dried through the medium of hot air; to provide means whereby the can ends are delivered one by one to a table within the drier and positioned in stack formation thereon; to provide means for imparting an intermittent step-by-step rotary movement to the table in such a manner that the table remains stationary while a stack is being formed, and is then rotated for a small portion of a revolution in order to receive a second stack etc.; and further to provide means whereby the lining and delivery of can ends to the drier is automatically stopped when a stack containing a predetermined number of can ends is completed and while the table is being rotated in order to bring a new portion of its surface to the stack receiving position.

Figure 10:
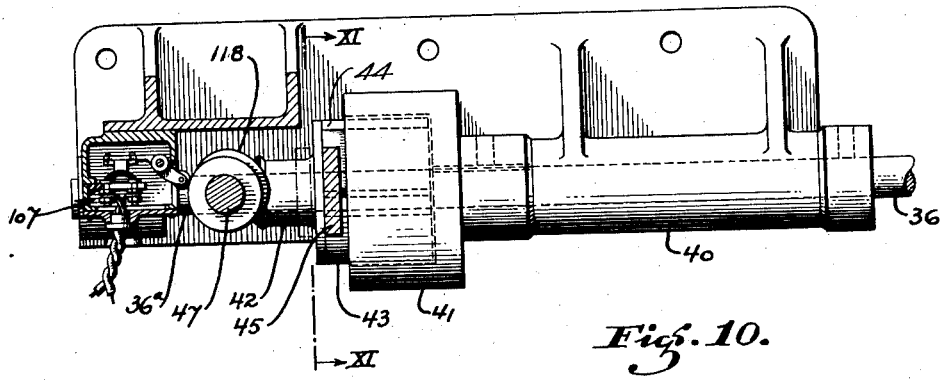
Figure 11:
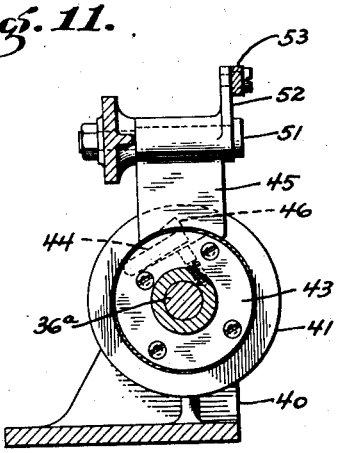
Figure 12:
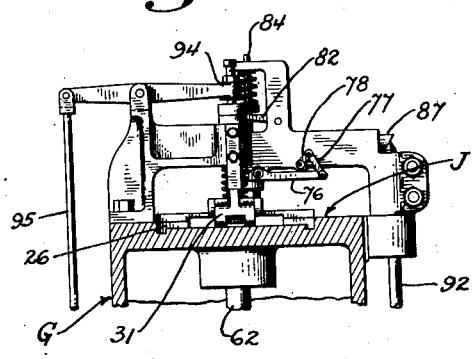

The invention is shown by way of illustration in the accompanying drawings, in which:

Fig. 1 is a side elevation of the machine,

Fig. 2 is a central vertical longitudinal section of that part of the machine whereby the can ends are first curled, secondly lined with the sealing compound, and third delivered to the drier, Fig. 3 is a cross section taken on line III—III Fig. 2, Fig. 4 is a plan view of the can end feeder, Fig. 5 is an enlarged detailed view partially in section, showing the mechanism whereby the valve controlling the flow of the sealing compound is actuated, Fig. 6 is a central vertical section of the drier and its actuating mechanism, Fig. 7 is a front view of the drier showing the actuating mechanism in elevation, and showing part of the drier housing in section, Fig. 8 is a horizontal cross section of the drier housing, said view also showing the table upon which the stacks are formed, Fig. 9 is a detailed plan view of the Geneva movement whereby intermittent rotary motion is transmitted to the drier table, Fig. 10 is a detailed sectional view of a portion of the clutch mechanism through which the Geneva movement is intermittently operated, Fig. 11 is a cross section taken on line XI—XI of Fig. 10, Fig. 12 is a vertical cross section taken on line XII—XII Fig. 2, said section showing the aligning mechanism and also the mechanism whereby the counting ratchet gear is actuated, Fig. 13 is a wiring diagram showing the several switches and magnets employed in conjunction with the parts of the mechanism.

Referring to the drawings in detail, and particularly Fig. 1, A indicates a substantially cylindrical-shaped housing which encloses a drying chamber. One side of the housing is provided with an opening which extends from the rod 2 to the rod 3. The can ends containing the sealing compound are introduced one at a time through this opening, and they are also removed in completed stacks through the opening, as will hereinafter be described.

The upper end of the housing is closed by a cover or a head member B, while the lower end of the housing is closed by a table C', this table serving the function of receiving and supporting the can ends to be dried. The table is in this instance divided into sixteen compartments, said compartments being separated by vertically disposed partition plates, such as indicated at 4 leaving the ends of the compartments adjacent the periphery of the table open. Guide rods 5 are mounted in each compartment and the can ends to be dried are delivered at the table surface and are stacked between the rods. When the machine is in full operation each compartment will contain a stack of can ends. It takes approximately thirty minutes for the table to make one complete revolution, hence when the can ends are delivered to the table and the stack is completed, it will remain in the drier approximately thirty minutes whereafter it will be removed so as to make place for further stacks of can ends. Warm or hot air is circulated through the compartments, and upwardly and around each stack, while it remains in the drier, and the manner of delivering the hot air and of uniformly distributing it into the several compartments will now be described.

Forming a part of the head member B, and extending downwardly therefrom is a perforated cylinder generally indicated at C. Connected with the upper end of the head B is an air heater D, to which air is delivered in any suitable manner. The air in passing through the heater D is heated to a desired temperature. It is then directed downwardly into the cylinder C. The air escapes through perforations formed in the cylinder C, and as these communicate with the several compartments containing the stacked can ends, air will circulate around the can ends and then upwardly and will finally escape into a discharge passage E, which is also supported by the head B. The air, after passing through the passage E, finally escapes through a stack or exhaust pipe F. The discharge duct or passage E has a bottom portion (see Fig. 7) such as indicated at 6. This is provided with a series of circular holes, generally indicated at 7, the holes aligning with the respective compartments in which the can ends are stacked. A suction blower or the like may be connected with the exhaust pipe F and suction is thus continuously maintained in the discharge duct E, causing the air to be sucked upwardly through the perforations or holes 7. This is important as the air is in this manner drawn downwardly through the heater D and the cylinder C, and as such will pass through the perforations in the cylinder C into the respective compartments from where it will be drawn upwardly in a column form around the stacked can ends and then through the openings 7 into the discharge duct, thereby causing uniform distribution around the peripheral edges of the can ends.

It should also be noted that the stationary perforated cylinder C is provided with a bottom section, such as indicated at 8, and that this has a central opening 9 formed therein. Part of the air discharges downwardly through this opening and into a space 10. The air thus passes over the surface of the table C', and it then discharges through perforations 11 which line up with the lowerformost can end or ends in the stacks, thus insuring drying of the lowermost ends as well as the upper and intermediate ends.

The drier shown in the present instant is connected with a machine which curls the can ends and fills the curled portion with a sealing compound. This machine also delivers the can ends one by one to the drier, and it places the can ends in stack formation in the drier.

The mechanism whereby the can ends are curled and the curled edge partially filled with the sealing compound is best illustrated in Figs. 1, 2, 3, 4, 5 and 12. The machine consists of a main frame G, having a base portion H whereupon the drier housing A and a part of the driving mechanism are supported, the main frame G and the base portion H being supported by legs I. The main frame supports a table J, and this in turn supports a can end receiving magazine 14, a can end curler generally indicated at 15, and a compound feeder 16. The can ends to be curled and filled with the sealing compound are placed in stack formation in the magazine 14, and they are released one by one from the bottom end of the magazine and are then first advanced through the curler secondly to the sealing filler, and third to the table of the drying machine. The can end table of the drying machine may be provided with any suitable form of feeding mechanism whereby the can ends are released, one by one, and dropped on the surface of the table J. The feeding mechanism whereby the can ends are released one by one is not illustrated, as a number of different types of feeders may be employed, but a part of the mechanism whereby said feeder is actuated is shown in Fig. 1. It consists of an eccentric, generally indicated at 17, which is connected through means of a link 18 with a crank arm 19, this arm is secured on the lower end of a vertically disposed shaft 20 and the upper end of this shaft is provided with an operating link 21 whereby the feeder of the magazine 14 is actuated. The magazine feeder operating mechanism is driven from a shaft 22, which is continuously driven when the machine as a whole is in operation. Shaft 22, besides operating the magazine feeder, also operates a main feeder, shown in Fig. 2 through means of a rocker arm 23. One end of the rocker arm is connected through a connecting rod 24, which in turn is connected with a crank on the shaft 22, the opposite end of the rocker arm 23 being connected through a link 25 with the main can end feeder.

This feeder consists of a rectangular shaped plate generally indicated at 26. A rectangular shaped opening 27 is formed in this plate. Supported by the sides of the plate, and projecting inwardly over the opening 27 are a plurality of pairs of feeding fingers, indicated at 28, 29 and 30. These feeding fingers are disposed at the same level as the can-ends, and in the forward movement of the rectangular plate 26 in the direction shown in Fig. 4 by the arrow $a$ they engage the rear edges of the can-ends, and move them forward; the fingers 28 move the can-end from the position shown in dotted lines at 14a, where it was released by the magazine feeder, to the position 15a, where it is engaged by the curler, and the flange of the can-end is curled; the fingers 29 engage the can-end previously delivered to the curler at 15a, and carry it to the position 16a, where it is engaged by the liner, and the curled flange is filled with sealing compound; the fingers 30 move the previously delivered can-end from the liner at 16a, and deliver it to position 31a; and the pivoted dog 31 engages the can end at 31a, and places it on the surface of the table C' under the stack.

When the frame 26 moves back on its return stroke, the fingers 28, 29, and 30, and the pivoted dog 31, return to their original positions, shown in Fig. 4, leaving the can-ends in their new advanced positions; the pivoted dog 31 riding over the can end at 31a, the fingers 30 and 29 passing underneath the can ends at 16a and 15a, respectively, which can ends become elevated above the level of the fingers, as it will be hereinafter described; while the fingers 28 pass the position 14a, before a can end is released from the can end magazine.

The can ends are stacked on the table in the following manner. By referring to Fig. 2 a number of can ends are shown in stacked formation, as at 32. At the edge of the drying table is formed an inclined surface which begins at a point a short distance within the circular edge of the stack and extends inwardly to a point adjacent the center of the stack as shown at 33 in Fig. 8; a space is thus formed between the bottom of the stack and the supporting surface of the table as shown in Fig. 4. When a can end engaged by the pivoted dog 31 is moved forwardly the leading edge of the can end will enter the space and will assume a position below the peripheral edge of the bottommost can end in the stack before coming in contact with the inclined surface 33. It then engages this inclined surface and rides up the incline and as such is introduced between the supporting surface and the bottommost can end in the stack and inserts itself below the stack. In other words, each can end delivered or ejected by the dog 31 is delivered to the bottom of a stack and as many can ends may be stacked vertically as desired.

In other words, the height is only determined by changing conditions, or the length of the shipping cases in which they are packed. In some instances, as many as two hundred and fifty can ends are placed in a stack and when that number of ends has been stacked it is obviously necessary to stop the feeding operation and to for a small portion of a revolution rotate the table so that the stack when completed may be moved into the drying chamber, and so that a new compartment is moved into position for the reception of the next stack to be formed.

An automatic mechanism has been provided for stopping the feeding, curling, the lining and the delivery of can ends to the table during this period, but before describing this mechanism it is essential that other parts of the mechanism be first described. First of all, let it be understood that the machine as a whole is driven from a main drive shaft, generally indicated at 35 (see Fig. 1). This shaft drives two intermediate drive shafts, indicated at 22 and 36. The shafts 22, 35 and 36 are continuously driven, shaft 36 being driven through a chain drive indicated at 37, and the shaft 22 through a chain drive indicated at 38. Shaft 36 serves only one function—to wit, that of driving the mechanism whereby the drying table C' is intermittently rotated. Shaft 22 on the other hand serves several functions, first that of driving the mechanism whereby the magazine feeder is actuated, secondly that of driving the main feeder shown in Fig. 4, third that of driving the curler generally indicated at 15, and fourth that of driving the liner mechanism generally indicated at 16, or in other words, the mechanism which delivers the sealing compound to the can ends.

The mechanism driven by the shaft 36 will next be described. This mechanism imparts an intermittent rotary motion to the drying table C', and is best illustrated in Figs. 1, 6, 7, 9, 10 and 11. Shaft 36 is journalled in a bearing, generally indicated at 40, see Fig. 7. Keyed or otherwise secured on the shaft 36 is a continuously driven clutch member 41. Forming an extension of the drive shaft 36 is an intermittently driven shaft 36a, which remains normally at rest. This shaft aligns with the shaft 36 and it carries a bevel gear 42 and a clutch member 43. The clutch member 43 is partially enclosed by the continuously driven clutch member 41. Clutch member 43, see Fig. 11, carries a spring actuated pawl 44 and when it is at rest the pawl is held in a depressed position by means of a dog 45 pivoted at 51. When the dog is swung about its pivot so that the lower edge thereof is moved from its normal position, shown in Figs. 7 and 10, towards the left, and out of alignment with the protruding portion of the pawl 44, the latter springs outwardly and engages a shoulder 46 formed on the interior surface of the continuously driven clutch 41, thereby forming a driving engagement between the clutch members 41 and 43, and causing power to be transmitted to shaft 36a when such engagement is made. The shaft 36a will continue to revolve until the dog 45 is again brought to the position shown in Figs. 7 and 10, when the lower end of the dog 45 will again be in alignment with the projecting end of the pawl 44 and until the said projecting end will enter beneath the end of the dog 45. When shaft 36a is rotated power is transmitted to a vertically disposed shaft 47 through the gear 42 and an intermeshing gear 48. Shaft 47 in turn operates a Geneva cam indicated at 49, which in turn operates a Geneva star indicated at 50. Dog 45 normally holds the pawl 44 in a depressed position, but it is moved out of engagement with the pawl whenever a stack is completed, so as to permit the clutch to be engaged and the Geneva movement to be operated, so as to impart rotation to the table. The dog 45 is pivotally mounted as at 51, see Fig. 7, and it is provided with a crank arm 52 which is connected through a link 53 with the armature 54 of a magnet 55. This magnet is energized at the time a stack is completed, and at no other time, and it is merely energized for such a period of time as will be required to rotate the drying table C' one-sixteenth of a revolution, this being due to the fact that the table is provided with sixteen drying compartments, as shown in Fig. 8, and the Geneva star is consequently provided with sixteen slots and segments.

The manner in which the circuit is closed through the magnet 55 will hereinafter be described. Some of the mechanism employed by the shaft 22 has already been described, to wit, the mechanism whereby the magazine feeder is operated and the mechanism whereby the main feeding plate 26 is operated. The curler mechanism and the liner mechanism are also operated from this shaft, and so is the counting mechanism, hereinafter to be described, the counting mechanism however being indirectly actuated by the liner mechanism. The liner mechanism and the curler mechanism in reality form no part of the present invention, but parts of the mechanism actuated thereby do form a part of the invention and it is thought more or less essential to submit a brief description of the liner mechanism and the curler mechanism.

The curler consists of a head member or chuck 15b, secured on a shaft 15c which is journalled in the bearing 15d. Disposed below the chuck member 15b and mounted to permit both rotary and vertical movement is a shaft 60. This shaft carries a cooperating chuck 61 upon which a can end is disposed when moved from the first to the second position shown at 15a in Fig. 4.

The liner mechanism is similarly provided with a chuck 16b secured on the shaft 16c journalled in the bearing 16d. A shaft 62 capable of both vertical and rotary movement cooperates therewith and this shaft is provided with a cooperating chuck 63 upon which the can end is deposited when assuming the third position indicated at 16a in Fig. 4. The shafts 60 and 62 are driven in unison from a centrally disposed gear 64 which intermeshes with the pinions 65 and 66 secured on the respective shafts 60 and 62. Gear 64 is in turn continuously driven from shaft 22 through means of bevel gears, such as indicated at 67 and 68. The shafts 60 and 62 are both provided with collars, such as shown at 69 and these collars are engaged by a fork-shaped lever 70 which is operated through means of a link 71, a pusher rod 72, and a cam 73 (see Fig. 3)—cam 73 being also secured on the shaft 22. In other words, both of the shafts indicated at 60 and 62 are lifted in unison by means of the rocker arm 70 and cam 73 and they are both rotated in unison through means of the gears 64, 65 and 66. It shall be noted that the timing of the movement of the feeder plate 26 relative to that of the shafts 60 and 62 is such, as to cause said shafts to be at their upward positions, at the time the fingers 29 and 30 are moving on their return stroke and while passing the positions 15a and 16a respectively.

The vertical movement of the shafts 60 and 62, together with the respective chucks supported thereby and indicated at 61 and 63 is comparatively small. If a can end is deposited on each of the chucks 61 and 63 vertical movement will be transmitted to the upper chucks indicated at 15b and 16b. On the other hand, if can ends are not deposited on the chucks 61 and 63, no vertical movement will be transmitted to the chucks 15b and 16b. This is important, particularly in connection with the liner, as the vertical movement imparted to the chuck 16b and the shaft 16c serves the purpose of actuating other mechanism, first a valve whereby the flow of sealing compound to the can end is controlled, and secondly a counting mechanism which determines the number of can ends in the stack. The mechanism whereby the valve controlling the flow of compound is actuated is best illustrated in Figs. 2, 3, and 5.

By referring to Fig. 2 it will be noted that the vertical shaft 16c is provided with a collar, indicated at 16e. This collar will, during vertical movement, engage the outer end 75 of a lever indicated at 76. This lever is connected through means of a link 77, with a crank arm 78 secured on a shaft 79. This shaft also carries a cam, as indicated at 80. The valve through which the compound is delivered is generally indicated at 81. It is normally closed, but it is adapted to be opened through means of a lever 82, one end of which engages a collar 83 secured on the valve stem 84. The lever 82 is pivoted as at 85, and it is provided with a short arm, as indicated at 86. This arm lies directly above the sliding bar generally indicated at 87. This sliding bar is slotted and pivotally mounted in the slotted portion is a dog 88, which is normally held in a depressed position, or out of engagement with the cam 80, by means of a spring 89. The outer end of the slide bar 87 is beveled, as at 90, and it is adapted to be engaged by the upper beveled end 91 of a pusher rod 92, this pusher rod being actuated by a cam 93 secured on the shaft 22.

During the rotation of the shaft 22 the pusher rod is raised once during each revolution. The upper end 91 accordingly engages the beveled end 90 of the sliding bar, and thus imparts an inward reciprocal movement thereto. If the dog 88 remains in its depressed position no movement is imparted to the arm 82 and the valve 81 will remain closed. On the other hand, if lever 76 is engaged at its outer end indicated at 75 by means of the collar 16e, rotary motion will be transmitted through a link 77 to rock the shaft 79. Cam 80 will thus swing upwardly and raise the dog, and hence bring it into engagement with the lower end of arm 86, hence when lever 76 is actuated the dog 88 is raised, rocker arm 82 will be actuated and valve 81 will be opened. In other words, if a can end is introduced between the chuck members 16b and 63 vertical movement will be transmitted to the shaft 16c and collar 16b, and valve 81 will be opened to deliver sealing compound to the can end. On the other hand, if no can end is deposited on the head 63 no movement will be imparted and the valve will remain closed.

It was previously stated that the shaft 16c performed another function, to wit that of actuating the counting mechanism, whereby the number of can ends piled up or delivered to a stack is controlled. This counting mechanism is best illustrated in Figs. 1, 12 and 13. By referring to these figures it will be noted that an arm 94 is disposed directly above the upper end of shaft 16b. This arm is raised whenever the shaft 16b is raised, and it remains stationary whenever shaft 16b remains stationary. The arm 94 is connected through means of a link or rod 95, with a rocker arm 96. This rocker arm is pivotally mounted on a shaft 97, and the outer end of the rocker arm supports a pawl 98, this pawl engaging a ratchet gear 99 which is freely journalled on the shaft 97.

This ratchet gear functions as a counter and determines the number of can ends which each stack will contain. If the stack is to contain two hundred and fifty ends two hundred and fifty teeth will be formed on the gear 99, and it will make one complete revolution during the formation or building up of each stack. When a revolution is completed a trip pawl, indicated at 100, will engage the outer end of a rocker arm 101. This rocker arm is pivotally mounted on a shaft 102 and this shaft carries an arm 103 on which is mounted a pair of switch members 104 and 105, which are secured to it at different angles; the switch member 105 being set at an angle which is less than the angle of the switch member 104. The switch members are of the mercury tube type, that is, short glass tubes are provided which carry a pair of electric terminals, such as indicated at 104a and 105a. Each tube contains a small amount of mercury and when the arms 101 and 103 assume the position shown in Fig. 13 the tubes will be so inclined that the mercury will run to one end of each tube, keeping the circuit open. On the other hand, when the arms 101 and 103 are tilted by being engaged by the trip lever 100, the tubes will be tilted in the opposite direction and the mercury will run to the opposite end of the tubes and will close an electric circuit first between the contact terminals 105a and then between the terminals 104a. The switch 104 controls the circuit through the clutch actuating magnet, indicated at 55, while the switch indicated at 105 controls the circuit through a similar magnet indicated at 106. This magnet, by the way, controls the release of can ends from the magazine 14, and will hereinafter be referred to as the magazine magnet. The switches 104 and 105 complete the circuits through the magnets 55 and 106, while the switch indicated at 117 breaks the circuits. This switch is controlled by a cam, such as indicated at 118, and this cam is secured on shaft 47 which drives the Geneva movement.

The operation and function of switch 117 will hereinafter be described.

The mechanism actuated by the magnet, indicated at 106, is best illustrated in Figs. 1, 2 and 13. The magnet 106 is provided with an armature 107 and this is connected through means of a link 108 with a crank arm 109 which is secured on a shaft 110. This shaft extends crosswise of the table J, and it carries a rocker arm 111 (see Fig. 2). The lower end of this rocker arm is forked, and it engages a pin 112 at one end of a sliding plate 113. When the magnet 106 is energized a rocking movement is transmitted to the shaft 110. This imparts a rocking movement to the rocker arm 111 and this in turn engages the pin 112 and moves a slide plate 113 in under the magazine 14, thereby shutting off the supply of can ends to the tables. This takes place when a stack of can ends has been completed and while the table is being rotated to assume a new stack receiving position.

The operation of the magazine as a whole will be as follows:

With the magazine 14 filled with can ends, and with the machine in operation, it will be first stated that shafts 35, 36 and 22 are continuously operating. The clutch members 41 and 43 which cooperate with the shaft 36 to transmit power to the shaft 36a are, however, normally held out of engagement and the table C' within the drier will accordingly remain stationary.

Shaft 22, however, actuates a number of devices. First the magazine feeder which is actuated through means of the eccentric 17, secondly the main feeder 26 which is actuated by the rocker arm 23, third the curler indicated at 15, and fourth the liner indicated at 16. These several mechanisms are operating continuously, and during each reciprocal movement of the main feeder a can end will be released from the magazine 14 and will drop into the position shown at 14a in Fig. 4. The can end will be transferred to the second position shown at 15a where the flange of the can end will be curled over; third to the position shown at 16a where the curled over flange will be filled with sealing compound from the nozzle or valve 81; fourth it is transferred to the position shown at 31a and fifth it is transferred from this position by means of the pivoted pawl 31 to the table where it will assume the bottommost position in the stack, indicated at 32.

These several operations will continue and the ratchet gear 99 will be moved a distance of one tooth as each can end is transferred from the table J to the table C'. That is, each upward movement of shaft 16c will transmit movement to the arm 94. This in turn transmits movement through the rod or link 95 to the rocker arm 96, and the pawl 98 carried thereby will in turn engage the teeth of the ratchet gear and transmit a movement equal to one tooth.

A little while before two hundred and fifty can ends have been delivered to the table C', that is, before the stack will be completed, the trip pawl 100 will then actuate arm 101 and tilt the arm 103 carrying the switch members 104 and 105. The circuit will first be closed through the magnets 55 and 106. When magnet 106 is energized movement will be transmitted to the cross shaft 110 and the rocker arm 111 will be actuated to move the slide plate 113 in under the magazine, thus preventing further release of can ends from the magazine.

At this moment there will be three can ends left on the table J, but the main feeder slide 26 will continue feeding them forward. The counting mechanism will continue functioning until the last can end has passed the liner. The ratchet wheel 99, together with the pawl 100, will continue the tilting of the arm 103 together with the switches 105 and 104. The circuit through the switch 104 will then become closed and a magnet 55 will become energized.

Energization of the magnet 55 will attract the armature 54 and this will transmit movement through link 53 to the arm 52 thereby rocking shaft 51 which carries the dog 45. The dog 45 will thus swing out of engagement with the pawl 44, and as the latter is spring actuated it will swing outwardly and engage the shoulder 46 of the continuously running clutch member 41, thereby forming an interlock between the clutch members 41 and 43 so that motion is transmitted to the shaft 36a. The interlock between the clutch members 41 and 43 will not be broken until the magnet 55 releases the dog 45 and then not until the pawl 44 has come up to the position shown in Fig. 11. The shaft 36a in turn transmits movement through the gears 42 and 48 to the shaft 47, and as this carries the driving cam 49 of the Geneva movement, it will engage one of the slots in the Geneva star 50 and transmit movement thereto. During the interval of time, that the magnet 55 has released the clutch dog 45 and the time the Geneva cam 49 has moved from the position shown in Fig. 9 to the point where it enters the slot of the Geneva star 50 in order to advance the table C', the can ends remaining on the table J will all be transferred and stacked on the table C'. The arm 103, carrying the switches 105 and 104 will remain tilted keeping the two switches closed until after the feeding of can ends for another stack has started.

The Geneva cam 49, then engaging a slot in the Geneva star 50, will start moving the table C', and the cam 118 carried by the shaft 47 will then engage the arm 115 of the switch 117, opening said switch, whereby both magnets 106 and 55 become deenergized.

The de-energization of the magnet 106 causes the return of the slide 113, bringing back into operation the can end feeding mechanism, while the de-energization of the magnet 55 releases the dog 45, which returns again into alignment with the projecting end of the pawl 44, and is ready to break the interlock between the clutch members 43 and 41, when said pawl will come to the top, and thus stop the rotation of the shafts 36a and 47 after they have made one complete revolution. The table will meanwhile rotate for $\frac{1}{16}$ of a revolution, thus moving the completed stack of can ends out of alignment with the pivoted dog 31, and at the same time bring another drying compartment into receiving position.

The machine will again continue to feed, curl and line the can ends, and they will be delivered one by one to the table until the next stack is completed. The gear 99 will then have completed another revolution and the magnets will again be energized, causing the slide plate 113 to move in under the magazine 40 so as to prevent delivery of can ends while the table is again rotated for a part of a revolution to bring the last completed stack out of alignment with the feeding pawl 31, and to bring a new compartment into receiving position.

In actual practice a completed stack remains within the drying chamber approximately thirty minutes. By that time the table has made one complete revolution and the stack which was first completed becomes exposed by passing beyond the rod indicated at 2, see Fig. 8.

The dried stack may here be removed by hand and disposed of in any suitable manner, for instance, by being placed directly in packing cases or otherwise.

In Fig. 13 the numerals 120 and 121 indicate the line wires whereby current is fed to the switches 104, 105 and 117, and to the magnets 55 and 106. A manually operated switch 122 for making or breaking the circuit when the machine is to be started or stopped is placed in the circuit and so is the telltale light, such as shown at 123. This light merely serves as a warning to indicate when a stack is completed and the table is to be rotated.

It is believed that the circuits are more or less self-explanatory, and a detailed description thereof is not essential.

One of the objects of this invention is to deliver to the drying chamber single can ends covered with wet sealing compound, build them inside the drier into stacks of uniform height to conform to the inside dimensions of the shipping boxes, each stack containing the same number of can ends, dry the composition uniformly, and remove the can ends from the drier in units of complete stacks, ready to be placed in packing boxes.

The vertical stacks of can ends inside the drier are subjected to the action of a current of heated air, circulating around the stacks within the drying compartment in an upward direction, to become discharged through the passage E and the exhaust pipe F.

The drying capacity of the air at the lower levels is considerably greater than at the upper levels, where it carries the vapors removed from the can ends at the bottom of the stack; the individual can ends forming the top of the stacks remain at this high elevation, from the time the completed stack is removed from the position opposite the opening in the outer wall of the casing or housing A, and brought inside the closed part of the drier, until the stack has traveled the entire circumference of the drier, and is brought again to the same opening to be discharged. The lower layers of can ends in the stacks are, during the same time, traveling at a lower level. The result would be that the lower can ends in the stack might become over-dried, and the composition, becoming brittle, would break up in a powder when the can ends were united with the can bodies by double seaming, while the upper can ends may carry too much moisture and not be dry enough.

To obviate this defect caused by the more rapid action of the lower strata of the drying air than the upper strata, the can ends, forming the upper part of the stacks, are delivered to the drier earlier, and remain in the drier longer, than the can ends forming the lower part of the stack, the building of the stack being from the bottom upwards.

In other words, the more rapid drying action of the dry air upon the vertically stationary lower can ends, than the damp air upon the upper can ends of the stack is compensated for by the difference in the time the upper can ends remain in the drier.

Having thus described our invention, what we claim and desire to secure by Letters Patent is:

1. In a machine of the character described a drying chamber having an opening for the admittance of single can ends and for the discharge of completed stacks of can ends, a supporting member rotatably mounted within said drying chamber and having a plurality of can end stack supporting receivers mounted thereon, a can end feeder adapted to deliver can ends one by one to one receiver at a time, automatically actuated means for transmitting movement to the supporting member when a stack of can ends is completed, so as to carry said completed stack from the position opposite said opening to a position inside the drying chamber and to withdraw another stack from inside the drying chamber and bring it opposite the opening for removal and place an empty receiver into alignment with the can end feeder, and means for drying the cans after stacking.

2. In a machine of the character described a supporting member having a plurality of can end stacking supporting receivers mounted thereon, a can end feeder adapted to deliver can ends one by one to one receiver at a time, automatically actuated means for transmitting movement to the supporting member when a stack of can ends is completed, so as to bring an adjacent receiver into alignment with the can end feeder, automatically actuated means whereby the can end feeder is rendered inoperative during movement of the supporting member, and means for drying the can ends after stacking.

3. In a machine of the character described, a table having a plurality of can end stack supporting and drying compartments supported thereby, a can end feeder adapted to deliver can ends one by one to one compartment at a time, means cooperating with the feeder whereby the can ends are stacked in the compartment, automatically actuated means for transmitting a rotary movement to the table when a stack of can ends is completed so as to bring an adjacent compartment into alignment with the can end feeder, automatically actuated means whereby the can end feeder is rendered inoperative during the rotary movement of the table, and means for subjecting the can ends to the action of a drying medium after stacking.

4. In a machine of the character described a cylindrical-shaped housing having an opening formed in one side thereof through which can ends may be introduced and removed, a table forming a bottom for the housing, a plurality of can end receiving and drying compartments formed on the table adapted to support can ends in stack formation, a cover member forming a closure for the upper end of the housing, said cover member having openings formed therein in alignment with the can end stack supporting and drying compartments, an air exhausting conduit connected with said openings, a cylinder secured to the cover member, said cylinder having perforations formed therein which align with the can end stack supporting and drying compartments, and means for delivering hot air to said cylinder, said air is discharging through the perforations into the drying compartments, the air then passing upwardly around the can end stacks, and through the openings of the cover member into the air exhausting conduit.

5. In a machine of the character described a cylindrical shaped housing having an opening formed in one side thereof through which can ends may be introduced and removed, a table forming a bottom for the housing, a plurality of can end receiving and drying compartments formed on the table adapted to support can ends in stack formation, a cover member forming a closure for the upper end of the housing, said cover member having openings formed therein in alignment with the can end stack supporting and drying compartments, an air exhausting conduit connected with said openings, a cylinder secured to the cover member, said cylinder having perforations formed therein which align with the can end stack supporting and drying compartments, means for delivering hot air to said cylinder, said air discharging through the perforations into the drying compartments, the air then passing upwardly around the can end stacks and through the openings of the cover member into the air exhausting conduit, a bottom member on the perforated cylinder, said bottom member being spaced from the top of the table to form an air passage, said bottom member having an opening formed therein through which hot air discharges from the lower end of the cylinder into said passage, and passages formed on the can end stack supporting members for directing hot air against the lowermost can ends in each stack.

6. In a machine of the character described a drying chamber, a supporting member having a surface adapted to support a can end stack placed within said chamber, means facilitating both, the entrance of the can ends beneath the stack and the lifting of the stack as it is being built, said means comprising an inclined surface formed by cutting away a part of said supporting surface thus producing a space beneath the bottom of the stack for the entrance of the can end, and means for forcing a can end over said incline beneath the stack, and means for subjecting the completed stack to the action of a drying medium circulating upwardly around the stack.

7. In a machine of the character described a drying chamber having an opening for the admittance of single can ends and for the discharge of completed stacks of can ends; a supporting member rotatably mounted within said drying chamber, a plurality of receivers each adapted to support a stack of can ends secured upon said supporting member, a feeder adapted to introduce can ends one by one into a receiver through said opening until a completed stack has been formed, automatic actuated means for advancing the receiver with the completed stack from the position opposite said opening to a point behind the wall of the drying chamber, and automatically actuated means whereby the can end feeder is rendered inoperative during the advance of the stack behind the wall of the drying chamber.

8. In a machine of the character described a drying chamber having an opening for the admittance of single can ends and for the discharge of completed stacks of can ends; a supporting member rotatably mounted within said drying chamber, a plurality of receivers each adapted to support a can end stack upon said supporting member, a feeder adapted to introduce can ends one by one into a receiver through said opening until a completed stack has been formed, automatic actuated means predetermining the number of can ends to be piled in a stack, and automatic actuated means for introducing the completed stack behind the wall into said drying chamber.

9. In a machine of the character described a drying chamber having an opening for the admittance of single can ends and for the discharge of completed stacks of can ends, a supporting member rotatably mounted within said drying chamber, a plurality of receivers each adapted to support a can end stack upon said supporting member, feeding means adapted to introduce can ends one by one into a receiver through said opening until a completed stack has been formed, automatic actuated means predetermining the number of can ends to be piled in a stack, automatically actuated means whereby said feeding means are rendered inoperative when said predetermined number of can ends has been stacked, and means for introducing the completed stack behind the wall of and into the drying chamber.

10. In a machine of the character described a drying chamber having an opening for the admittance of single can ends and for the discharge of completed stacks of can ends; a supporting table rotatably mounted within said drying chamber, a plurality of partitions arranged to form stacking and drying compartments supported by said table, a feeder adapted to introduce can ends into one compartment until a completed stack has been formed, means for imparting motion to said table in order to transfer the completed stack from a position opposite the opening to a point behind the wall of the drying chamber.

11. In a machine of the character described a drying chamber comprising an outer casing having an opening for the admittance of single can ends and for the discharge of completed stacks of can ends, a supporting circular table rotatably mounted within said casing, a central perforated cylinder stationarily secured above said table, a plurality of partitions arranged to extend from said cylinder to said outer casing to form a plurality of can end drying compartments open at one side when opposite said opening in the casing, a drying chamber comprising an outer casing having an opening formed in one side to admit and to permit discharge of an entire stack of can heads, means for rotating the table in order to bring the open sides of any compartment opposite the solid wall of said drying chamber to close the said open sides, and means for circulating drying air through said drying compartment.

12. A can end drying machine comprising a support upon which the can ends are supported in stack formation with the bottommost can end resting on the support and the remaining can ends resting one on top of the other, said support being cut away below the bottommost can end to provide a space beneath said can end which terminates in an inclined surface, means for delivering can ends one by one into the space below the lowermost can end and to direct the can end delivered up the inclined surface and under the lowermost can end in the stack, and means for subjecting the can end stack to a drying medium.

13. A can end drying machine comprising a support upon which the can ends are supported in stack formation with the bottommost can end resting on the support and the remaining can ends resting one on top of the other, said support being cut away below the bottommost can end to provide an inclined surface below and within the peripheral edge of the lowermost can end, means for delivering can ends one by one into the space below the lowermost can end and to direct the can end delivered up the inclined surface and in under the lowermost can end, and means for subjecting the can ends when stacked to a drying medium.

FRANK KRUEGER.
HENRY DOUGLASS.